(12) United States Patent
Hück

(10) Patent No.: US 7,946,034 B2
(45) Date of Patent: May 24, 2011

(54) METHOD FOR MANUFACTURING A TRIBOLOGICAL COMPONENT

(75) Inventor: Werner Hück, Lahnau (DE)

(73) Assignee: Schunk Kohlenstofftechnik GmbH, Heuchelheim (DE)

( * ) Notice: Subject to any disclaimer, the term of this patent is extended or adjusted under 35 U.S.C. 154(b) by 959 days.

(21) Appl. No.: 11/834,760

(22) Filed: Aug. 7, 2007

(65) Prior Publication Data

US 2008/0028604 A1 Feb. 7, 2008

(30) Foreign Application Priority Data

Aug. 7, 2006 (DE) .......................... 10 2006 037 117
Jan. 4, 2007 (DE) .......................... 10 2007 001 619

(51) Int. Cl.
*B21K 1/14* (2006.01)

(52) U.S. Cl. ............... 29/888.07; 29/888.076; 29/888.3; 29/415

(58) Field of Classification Search ............... 29/888.09, 29/888.3, 888.07, 888.076; 277/370, 497–499, 277/511

See application file for complete search history.

(56) References Cited

U.S. PATENT DOCUMENTS

| | | | |
|---|---|---|---|
| 1,467,256 A | | 9/1923 | Thomson |
| 2,719,767 A | * | 10/1955 | Fred .............................. 277/447 |
| 3,193,285 A | * | 7/1965 | Hamm .......................... 277/463 |
| 3,241,219 A | * | 3/1966 | Hamm ...................... 29/888.076 |
| 4,504,181 A | * | 3/1985 | Khoury .......................... 413/17 |
| 4,569,109 A | * | 2/1986 | Fetouh ....................... 29/888.09 |
| 6,217,222 B1 | * | 4/2001 | Mattson et al. ............... 384/503 |
| 7,673,388 B2 | * | 3/2010 | Hase ........................... 29/888.09 |
| 2003/0019111 A1 | * | 1/2003 | Korb et al. ...................... 30/351 |
| 2003/0221685 A1 | * | 12/2003 | Lang et al. ...................... 125/41 |

FOREIGN PATENT DOCUMENTS

| | | |
|---|---|---|
| DE | 44765 | 1/1966 |
| DE | 406762 | 8/1966 |
| DE | 10155653 | 5/2003 |
| GB | 1003913 | 9/1965 |

OTHER PUBLICATIONS

De.Z.: Schunk Kohlenstofftechnik GmbH: Lager and Dichtungstechnik 30 . 38/2005, pp. 1-18.

* cited by examiner

*Primary Examiner* — David P Bryant
*Assistant Examiner* — Moshe Wilensky
(74) *Attorney, Agent, or Firm* — Dennison, Schultz & MacDonald

(57) ABSTRACT

A method for manufacturing an annular tribological component in the form of a seal or a sliding bearing of a brittle material. In order to attain the necessary sealing action even with a segmented construction, without expensive reprocessing being necessary in connection with the manufacture of segment surfaces bounding on one another, it is proposed that the annular component be formed of segments made by breaking a ring element and that the segments be assembled such that fractured surfaces fitting one another lie one upon the other.

11 Claims, 3 Drawing Sheets

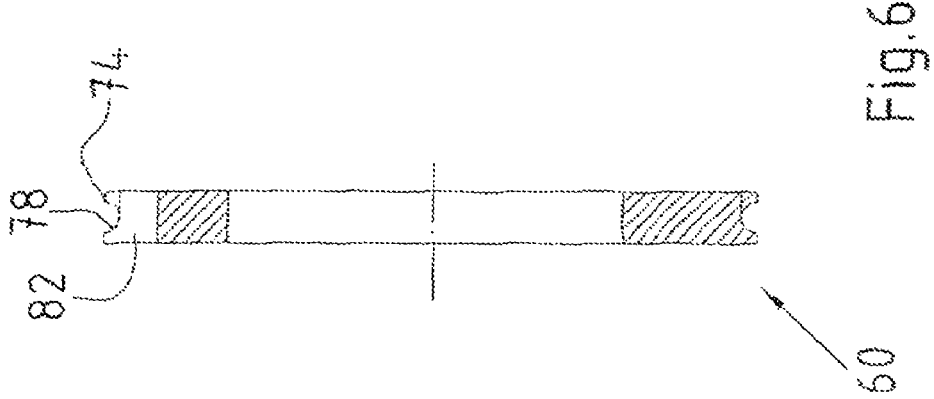
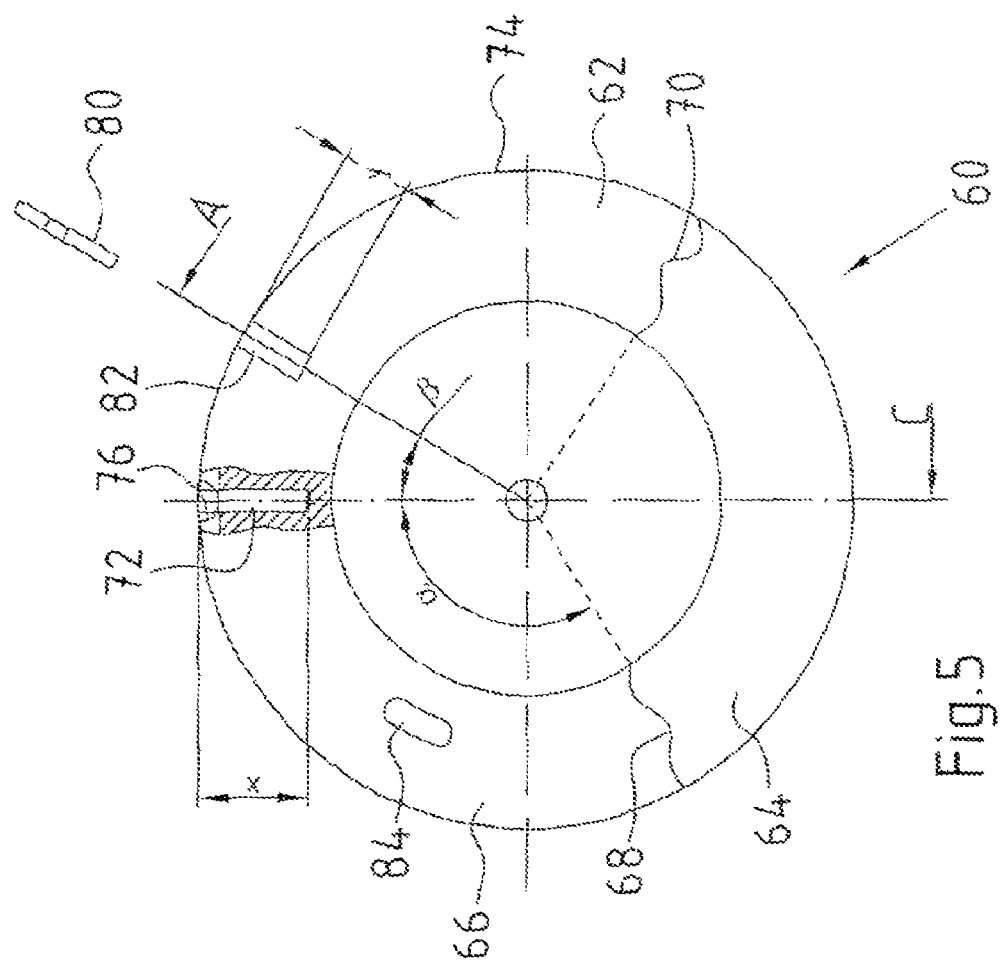

METHOD FOR MANUFACTURING A TRIBOLOGICAL COMPONENT

BACKGROUND OF THE INVENTION

The invention concerns a method for manufacturing a tribological component in the form of a ring as a seal or sliding bearing with an outer peripheral area, lateral surfaces as well as an inner surface, comprising the following steps:
manufacturing a one-part ring of brittle material,
breaking the ring into segments and
assembling the segments to construct the tribological component, whereby proceeding from one of the surfaces of the ring, depressions are constructed in the ring for breaking the ring into segments corresponding to the number of segments.

Sealing rings of carbon-graphite materials have been used for many years in radial seals in circulating as well as in axial motions due to the characteristic properties of these materials. Here the radial seals are predominantly in several parts, thus constructed segmented. The subdivision of the segments moreover depends on the size of the rings. In order to attain an optimal composition, the segments are characterized by numbers. The sealing rings themselves are then braced using springs against a shaft or piston rod.

A seal with segmented construction which is manufactured by breaking a ring and which consists of two parts is known from GB-A-1 003 913.

Sealing rings constructed in several parts are known from the DE.Z.: Schunk, Informational Publication, "Sealing Rings for Radial Seals," or DE.Z.: Schunk, Informational Publication, "Bearing and Sealing Technology," 2005. Moreover, a ring can be subdivided by sawing into three parts which border on one another in a blunt joint in use. There also exists the possibility of manufacturing the segments separately in order to assemble these in an overlapped, interwoven joint or overlapped joint.

A method for manufacturing a ring of at least three segments can be inferred from DD-B-44 765. The manufactured tribological component in the form of a ring has three broken-apart joints according to the representation of FIG. 2, owing to which a labyrinth-like sealing action results.

A sealing arrangement is known from CH-A-406 762 in which two-part sealing rings are used. Here the end surfaces can be lobed or unprocessed. A breaking of the rings takes place with the aid of a sharp edge.

A seal is known from US-A 1,467,256 which is divided into three parts using a sharp blade originating from a punch.

A representative method is known from DE-A-101 55 653. Notches which extend to the lateral surfaces originate from the inner surface of the ring for breaking the ring into three parts. A two-part disk is then inserted into the ring whose joints are oriented toward the notches. Subsequently, a tool is driven intermittently into the gap between the disks, due to which a breaking open or tearing apart of the ring occurs.

SUMMARY OF THE INVENTION

The present invention is based upon the objective of further developing a method of the type mentioned at the beginning, such that the ring can be broken into a desired number of segments, whereby fractured surfaces result which do not need a reprocessing. At the same time, it is to be guaranteed that a breaking into the desired number of segments can be conducted by a simple procedure.

For accomplishing the objective, the invention provides that, for breaking the ring, a tool is inserted into the depressions such that the ring breaks into the segments with fractured surfaces running radially and transversely in relation to the lateral surfaces of the ring.

In accordance with the invention, an annular component is subdivided by breaking a ring into segments which are then assembled such that their fractured surfaces which fit one another lie one upon the other. In this way, by creating the depressions and the direct introduction of the tool into the respective depression, it is assured that the ring is broken into segments such that the functional, thus sealing surfaces, are not harmed, so that the desired sealing function continuously exists. The depressions themselves run spaced in relation to the functionally relevant surfaces such as the lateral surfaces of the ring.

It is provided in accordance with the invention that the depression originates from a non-functionally relevant surface. Here, it is usually a case of the outer peripheral area or the inner surface of the ring. The depression itself can be constructed by a non-cutting method such as molding in the green body of the ring, thus not in the non-percolated state, or by cutting processes such as milling, boring or eroding.

It is in particular provided that the annular component is broken into three equal or nearly three equal parts, whereby the segments are assembled such that the sequence of the segments is retained. Consequently, the functional surfaces are retained, that is, the surfaces exercising the sealing action or the sliding surfaces remain unchanged without a gap or the like arising.

In other words, the segments are assembled such that their original sequence is retained, so that the breakage areas come to lie on one another with an exact fit and form-locking, so that the desired sealing or bearing action is guaranteed. Moreover, it is of particular advantage that optimal contact surfaces are available due to the division into three parts; at the same time nonetheless an economical manufacturing method can be used.

Through the theory of the invention, and especially the use of a tool with flat surfaces which run parallel or approximately parallel to the lateral surfaces when driving the tool into the depressions, defined fractured surfaces can be manufactured which consequently guarantee that the functional surfaces manifest the desired sealing action.

Carbon-graphite and electro-graphite materials enter the question as materials from which the tribological component is manufactured, as well as those which are infiltrated by salts, metals or resins. But usual ceramic material can also be used, such as, for example, oxide ceramic materials, such as aluminum oxide or non-oxide ceramic materials such as silicon carbide, silicon nitride, aluminum nitride, and boron carbide or boron nitride.

In particular, the [following] steps are provided for manufacturing an annular tribological component in the form of a seal or a sliding bearing:
Manufacture of a one-part ring of a brittle material with an outer peripheral area, lateral surfaces and an inner or outer surface which can be installed on a shaft or a piston rod,
Application of three radial depressions which originate from the inner or outer peripheral area of the ring,
Application of a tool into each of the depressions such that the ring breaks into three segments with fractured surfaces running radially and transversely in relation to the lateral surfaces of the ring, and
Assembly of the segments produced by breaking into a ring whereby the fractured surfaces fitting one another lie one upon the other.

Moreover, it is provided that the tool is successively introduced into the depressions for breaking the ring. Consequently, one tool does not engage into all depressions at the same time. The ring so manufactured consisting of the three segments is then surrounded circumferentially by a pressure or traction element.

The radial depressions are in particular introduced into the ring in connection with non-cutting construction before this is percolated, thus into the green body of the ring. With the cutting processing method, the depressions can be constructed after the ring is percolated. But a processing in the green stage is also possible.

The respective depression should run centrally between the lateral surfaces and end in the central region between the outer peripheral area and the inner surface of the ring, preferably penetrate ⅔ to ⅚, especially approximately ⅘ of the height of the ring proceeding from the outer peripheral area. If the depressions proceed from the inner surface, the distance between inner surface and the bottom of the depression would likewise amount to approximately ⅔ to ⅚, especially approximately ⅘ of the height of the ring.

Preferably, a total of three radially running depressions are introduced into the ring evenly distributed over the peripheral area as blind holes proceeding from the peripheral area, into which subsequently a tool can be driven in successively so that the ring breaks into the three segments, whereby the fractured surfaces run transversely, preferably perpendicular to the lateral surfaces.

The cone has a shape such that a diameter exists at a distance to the tip which is greater than the unobstructed diameter of the depression on the surface from which the depression proceeds so that the tip of the tool does not stand on the bottom of the depression before driving this into it.

In accordance with the invention, a brittle material is broken into more than two, preferably three parts. This is made possible in accordance with the invention in that the depressions are constructed previously at the fracture sites into which the tool is then introduced. In order that the fractured surfaces have the desired course, without material becoming detached in breaking the marginal areas of the fractured surfaces, whereby the sealing surfaces of the ring would be destroyed, it is especially provided that the tool can be introduced with a conically constructed tip, whereby the tip is flattened in the direction of the lateral surfaces of the ring.

The tool which can be inserted into the depression or the segment which acts upon the ring to break the ring can be compared with a flattened punch whose flat sides run along the lateral surfaces of the ring. A circumscription as a cone with two flat surfaces which are oriented along the lateral surfaces is also possible.

The cone has a shape such that a diameter exists at a distance to the tip which in the event of a blind hole as a depression is greater than the diameter of the blind hole before the tip would stand on the bottom of the blind hole.

In manufacturing the base ring with minus tolerance with reference to its inner diameter, the fractured surfaces of the segments first of all run at a distance from one another in enclosing a shaft in order then to impact upon one another after running in on block. In this way, it is assured that the desired sealing effect is attainable to a sufficient extent.

Furthermore, further depressions such as blind holes or grooves should proceed from a surface into which fixation or latching elements can be introduced in order to fix the sealing ring in place radially or axially. Moreover, the corresponding depressions can be those or segments of those which are needed for driving in the tool to break the ring. But there also exists the possibility of arranging the corresponding further depressions such as blind holes or grooves at a distance from the depressions required for the breaking.

BRIEF DESCRIPTION OF THE DRAWINGS

Further details, advantages and features of the invention emerge not only from the claims, the features to be inferred from these-by themselves and/or in combination-but also on the basis of the following description of a preferred embodiment to be inferred from the drawings, wherein:

FIG. 5 illustrates a further representation of a ring in plan view and FIG. 6 illustrates a section along the lines AC in FIG. 5.

DESCRIPTION OF THE PREFERRED EMBODIMENTS

To manufacture a tribological component in the form preferably of a seal (axial or radial seal) or a sliding bearing, a ring 10 made of carbon-graphite material, electrographite or ceramics such as SiC is manufactured which is then perforated to produce three segments 12, 14, 16 in the embodiment. The ring 10 can have a rectangular or rectangle-like or an unequal sided trapezoidal cross section, to name but a few examples. The segments 12, 14, 16 are then placed upon a shaft or a piston rod and enclosed circumferentially from a traction element such as a spiral tension spring so that the segments 12, 14, 16 sit upon the shaft or the piston rod and are likewise assembled circumferentially with an exact fit after running in. Thus the fractured surfaces 18, 20 or 26, 28 lie one on the other with an exact fit and form-locking. Moreover, the annular element can be constructed with minus tolerance in relation to its inner diameter so that the segments 12, 14, 16 run at first spaced from one another after being set upon a shaft or a piston with respect to fractured surfaces 18, 20, 22, 24, 26, 28, and form-locking mating occurs only after running in. An exactly fitting manufacture is obviously likewise possible.

There exists after the running-in a practically contact-free gap seal with minimal gap loss and therewith high sealing action.

Corresponding axial or bearing ring seals and radial seals are suited for circulating as well as for axial motions of a shaft or a piston.

Figure 2:
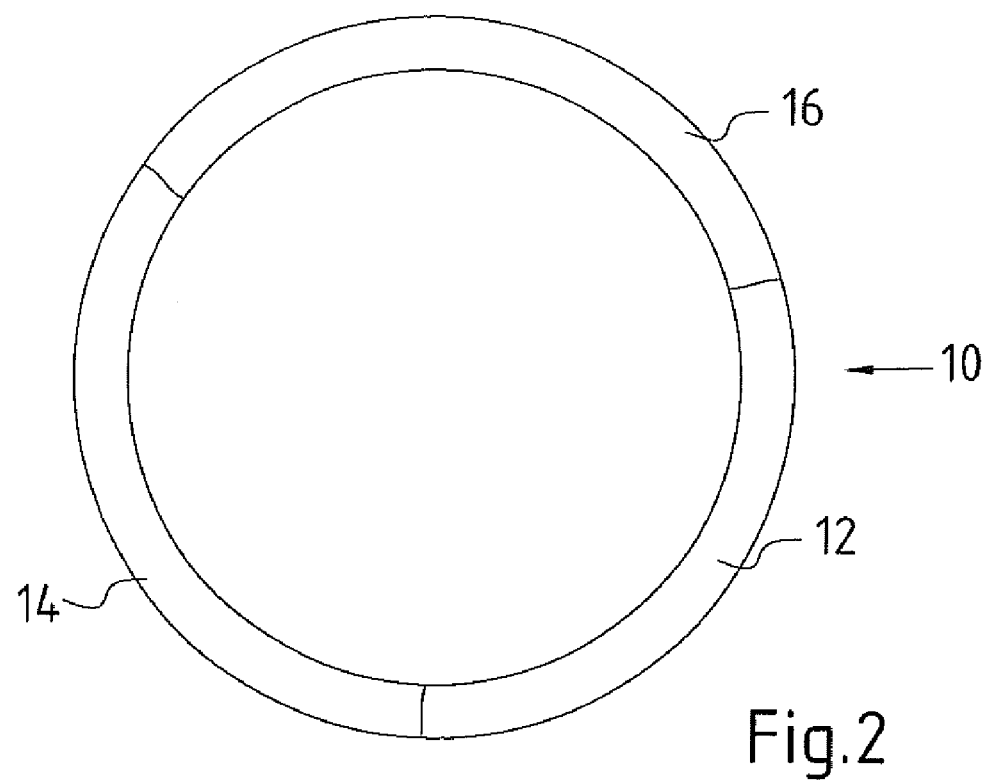
FIG. 2 illustrates a tribological component composed of the segments in accordance with FIG. 1.

In order to manufacture a ring to be inferred from FIG. 2 from a brittle material, thus to break a one-part ring into three parts which are equally large, the procedure according to the invention is as follows. After the ring has been manufactured in the usual manner from the brittle material, such as, for example, carbon-graphite material or electrographite material, which can if need be be infiltrated with salts, metals or resins, or a ceramic material, three depressions are introduced at the same distance from one another preferably in the form of bore holes 30 radially as well as centrally between the lateral surfaces 36, 38 of the ring 32. Moreover, a bore hole 30 representing a blind hole should have a depth which runs at least approximately in the center, preferably ⅔ to ⅚ between the outer peripheral area 34 and the inner surface 40 of the ring, thus approximately ⅓ to ⅙ before the inner surface 40 ends. The tip 42 of a tool is then introduced into the borehole.

The tip tapers conically and is flattened such that the wider side extends along the lateral surfaces 36, 36 of the ring 32. Conditioned in this way, forces originating from the bore hole 30 act upon penetration of the tool into the bore hole 30 in the direction of arrows 44, 46, owing to which the ring 32 breaks on a plane which runs transversally or perpendicular to the lateral surfaces 36, 38 as well as to the outer peripheral area 34 and the inner surface 40. This is indicated purely schematically by line 48, 50 in FIG. 3.

In other words, the tip 42 of the tool is to be compared with a flattened spear tip or with a flattened punch, whereby the wide sides extend along the lateral surfaces 36, 38 of the ring upon penetration of the tool into the bore hole 30.

Figure 1:
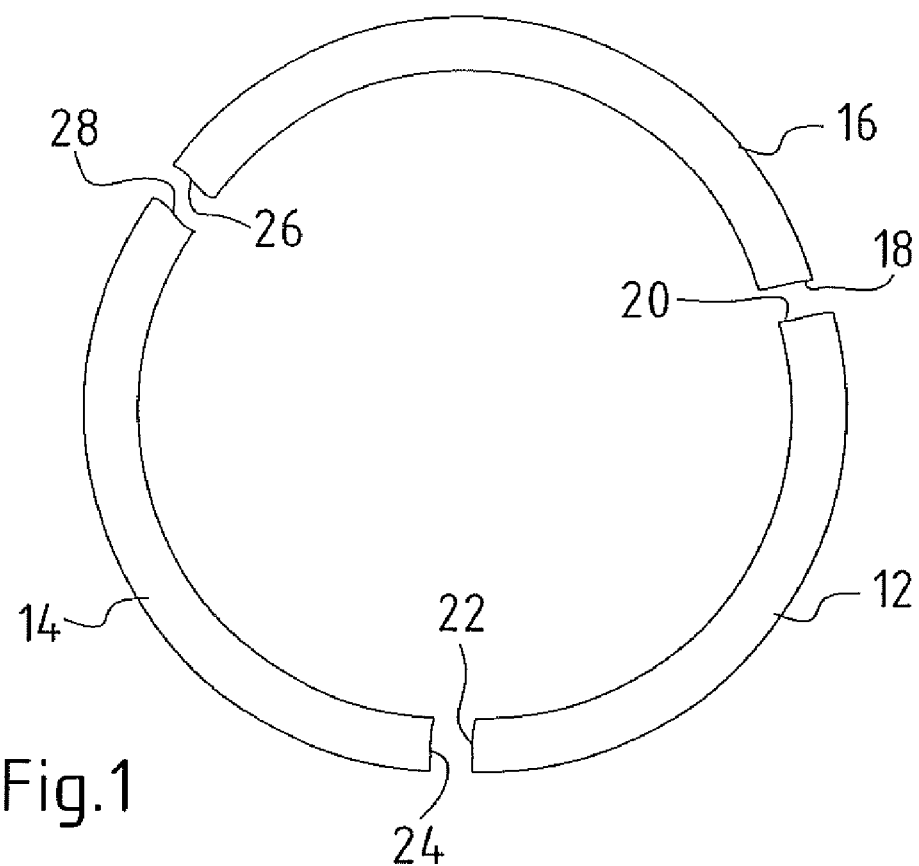
FIG. 1 illustrates three segments of an annular component.
Figure 3:
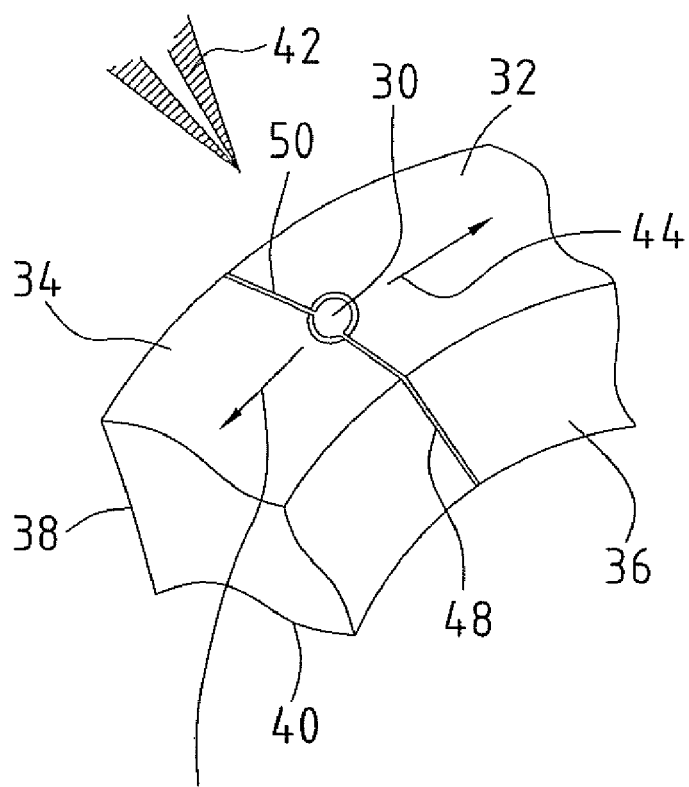
FIG. 3 illustrates a cutout of a ring in the region in which the latter is subdivided by breaking.
Figure 4:
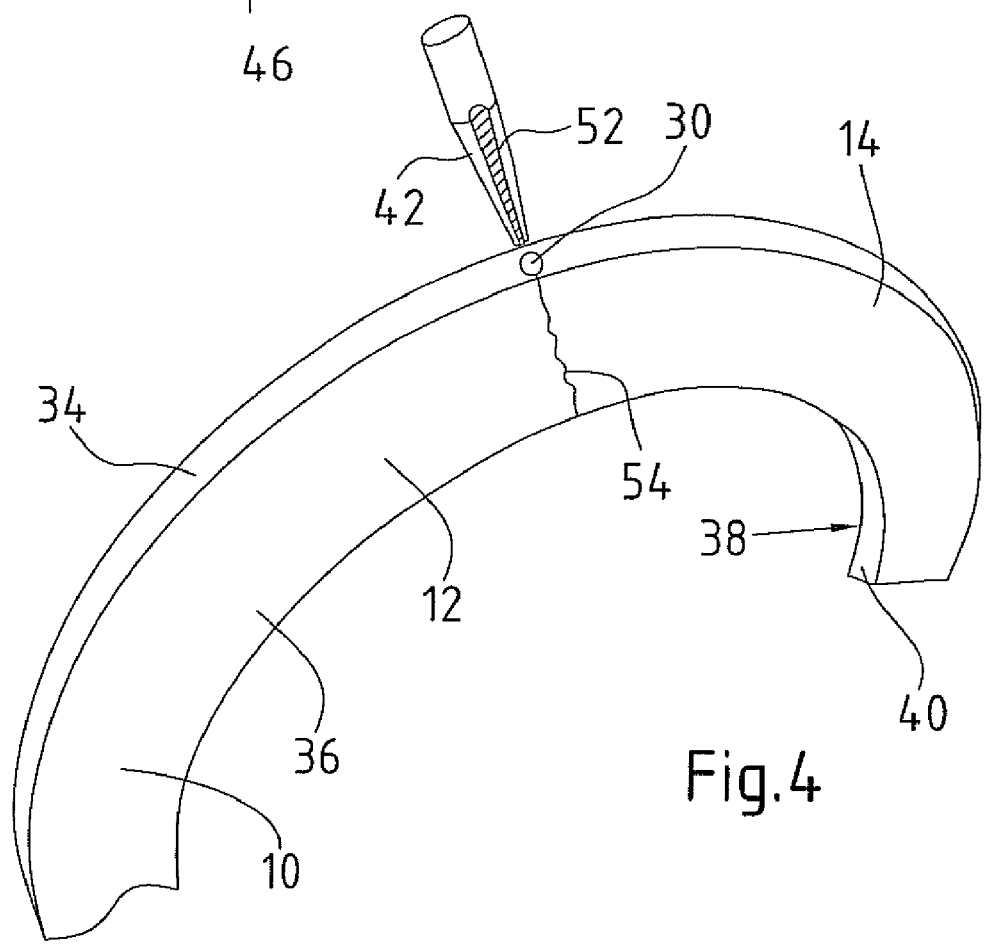
FIG. 4 illustrates a cutout of a ring with a depression proceeding from the outer peripheral area and allocated tool.

The method of the invention for manufacturing fractured surfaces in a subdivided ring are to be clarified once again on the basis of FIG. 4, in order then to make available a tribological component in the form of a seal or a sliding bearing by assembling the segments manufactured by breaking. Here the reference numbers which are used in connection with FIG. 1 to 3 are used.

The ring 10 represented in cutout in FIG. 4 has a depression 30 proceeding from the outer peripheral area 34 which is constructed by a cutting processing method such as milling or eroding. The tip 42 of the tool is then pushed into the depression 30. The tip moreover tapers conically toward the free end and has flat surfaces 52 which are oriented parallel to the lateral surfaces 36, 38 of the rings 10 when the tip 42 is pushed into the depression 30. In this way, a continuous crack 54 arises which specifies the fracture of the ring 10 under the influence of force to the regions adjacent to the crack 54. A breaking out of the edges of the fractured surfaces does not take place so that the individual segments can be assembled with an exact fit with the consequence that the lateral surfaces 36, 38 guarantee the necessary sealing action.

If the depression 30 proceeds from the outer peripheral area 34 in the embodiment, then there obviously exists the possibility that corresponding depressions 30 originate from the inner surface 40 whose longitudinal axes should run parallel to the lateral surfaces 36, 38 and centrally between these.

The depth of the recesses in connection with which it is preferably a matter of blind holes, in particular depends upon the material used. Experiments have established that the bottom of the depression 30 should end approximately at the distance from $2/3$ to $5/6$ of the height of the ring 30 proceeding from the opening. Other dimensionings are likewise possible. The depression 30 can also be constructed as a through-bore or a bore hole if need be, thus extending from the outer peripheral area 34 to the inner surface 40, without leaving the invention, to the extent that it is not a matter of functional surfaces in this connection.

If preferably the three bore holes 30 distributed at equidistant spacing along the outer peripheral area 34 are introduced following production of the ring 32, the corresponding depressions can obviously be formed out during production of the ring 32.

A top view of a sealing ring 60 is represented in FIG. 5 which in accordance with the theory of the invention is broken into three segments 62, 64, 66 and then assembled again. Here the spacing between the fracture lines or fractured surfaces 68, 70 can be distributed equidistant over the circumference, thus the fracture lines 78, 70 enclose an angle $\alpha$, which amounts to 120° or approximately 120°. One will furthermore recognize that depressions, especially in the form of blind holes 72, are introduced beforehand on the fracture sites or fractured surfaces 68, 70 to be created to break the ring 60 into segments 62, 64, 66, which extend above the height of the ring 60 originating from the outer surface 74 with a measure x which corresponds approximately to $2/3$ to $5/6$ of the height of the ring 60 without a restriction of the theory of the invention taking place in this way. Independently of this, the diameter of the blind hole 72 is such that the latter is smaller than the width of the ring 60, thus the blind hole 72 or a corresponding depression extends exclusively within the ring. This nonetheless does not rule out that a groove 76 running in the axial direction runs in the outer edge region from the bottom of which the blind hole bore hole 72 then originates.

Corresponding to the state of the art, the peripheral area 74 has a circular groove 78 in which a locking ring is introduced in order to secure segments 62, 64, 66. In order to prevent a radial or axial displacement of the sealing ring 60 after arranging this on the shaft, grooves or blind holes in accordance with further sealing arrangements are moreover provided into which latching or fixing elements 80 engage, which proceed, for example, detachably from a partition of a chamber into which the sealing ring or several sealing rings 60 are introduced. As is apparent on the basis of FIGS. 5 and 6, a groove 82 running axially from the peripheral area 74 proceeding as a receptacle for the latching or fixing element 80, preferably constructed as a pin or a plate, can be provided which describes an angle $\beta$, which can lie between 0° and 120°, in relation to the blind hole 72 into which the tool is introduced for bursting the sealing ring 60. Consequently, the blind hole 72 also serves as a receptacle for the fixing element 80. If a groove is used for accommodating the fixing element 80, then the groove obviously may not penetrate any functional surfaces of the sealing ring. The depth y of the groove 82 or the blind hole can lie in the range of half the height of the ring 60.

If the receptacle for the fixing element 80 preferably proceeds from the outer peripheral area 74, then a corresponding depression 84, such as an oblong hole, into which the fixing element engages can also be created in a lateral surface.

The number of receptacles for fixing elements is not restricted to one. Rather, many receptacles can be created in the sealing ring 60 and many fixing elements can be used in accordance with the requirements.

If the method of the invention has been explained on the basis of a ring to be broken into three parts, it is not a departure from the invention if a ring is to be subdivided into a number deviating from this and/or the segments have different arch lengths.

Furthermore, the depressions specifying the cracks and therewith the fractured surfaces can also be created already before finishing the ring, especially in the green body using pressing in, for example.

What is claimed is:

1. Method for manufacturing a ring-shaped tribological component which is a sealing ring or sliding bearing with an outer peripheral surface, inner surface, and lateral surfaces, comprising the steps of:

obtaining a one-part ring of brittle material, forming a plurality of depressions in the one-part ring extending from at least one of the outer peripheral surface and the inner surface, the depressions being in a number corresponding to a desired number of segments into which the one-part ring is to be broken, inserting successively into each of said depressions a tool having a conical tip with flattened surfaces, the flattened surfaces being oriented substantially parallel to the lateral surfaces, thereby breaking the one-part ring into the plurality of segments with fractured surfaces running radially and transversely in relation to the lateral surfaces, and assembling the segments to construct the tribological component.

2. Method according to claim 1, wherein each said depression is constructed proceeding from a non-functionally relevant surface of the subdivided ring and ends at a distance in relation to the functionally relevant surfaces.

3. Method according to claim 1, wherein each said depression is constructed proceeding from at least one of the outer and inner surface of the subdivided ring and runs radially.

4. Method according to claim 1, wherein each said depression is created with a non-cutting method or through a cutting processing method.

5. Method according to claim 4, wherein the non-cutting method comprises pressing into the one-part ring in a green stage.

6. Method according to claim 4, wherein the cutting processing method comprises milling, boring or eroding into a percolated ring.

7. Method according to claim 1, wherein the plurality of depressions comprises at least three said depressions formed in the one-part ring, distributed over the outer peripheral surface or the inner surface.

8. Method according to claim 1, wherein the plurality of depressions comprises three said depressions distributed evenly over the outer peripheral surface or inner surface.

9. Method according to claim 1, wherein each depression is formed along an axis lying approximately centrally between the lateral surfaces of the one-part ring.

10. Method according to claim 1, wherein the one-part ring has a known height, and each depression has a depth of $2/3$ to $5/6$ of the height of the one-part ring.

11. Method according to claim 1, additionally comprising forming a further depression into the outer peripheral surface of the one-part ring, and inserting into said further depression a latching or fixing element.

* * * * *